(12) United States Patent
Strausz

(10) Patent No.: US 12,190,399 B1
(45) Date of Patent: Jan. 7, 2025

(54) CALCULATING A RECIDIVISM PROBABILITY SCORE FOR COMPLIANCE-BASED IGNITION INTERLOCK DEVICE REMOVAL

(71) Applicant: 1A Smart Start LLC, Grapevine, TX (US)

(72) Inventor: Matt Strausz, Grapevine, TX (US)

(73) Assignee: 1A Smart Start LLC, Grapevine, TX (US)

( * ) Notice: Subject to any disclaimer, the term of this patent is extended or adjusted under 35 U.S.C. 154(b) by 789 days.

(21) Appl. No.: 17/215,497

(22) Filed: Mar. 29, 2021

Related U.S. Application Data

(63) Continuation of application No. 17/180,426, filed on Feb. 19, 2021, now abandoned.
(60) Provisional application No. 62/979,946, filed on Feb. 21, 2020.

(51) Int. Cl.
| | | |
|---|---|---|
| *B60R 25/10* | (2013.01) | |
| *B60K 28/06* | (2006.01) | |
| *G06N 7/01* | (2023.01) | |
| *G06Q 50/26* | (2012.01) | |
| *G06N 20/00* | (2019.01) | |

(52) U.S. Cl.
CPC ......... *G06Q 50/265* (2013.01); *B60K 28/066* (2013.01); *G06N 7/01* (2023.01); *G06N 20/00* (2019.01)

(58) Field of Classification Search
CPC .... G06Q 50/265; G06Q 10/06; G06Q 10/063; G06Q 50/01; B60K 28/066; G06N 7/01; G06N 20/00; H04L 67/535; H04L 12/1822

USPC ......... 340/426.13, 426.3, 439, 426.11, 425.5
See application file for complete search history.

(56) References Cited

U.S. PATENT DOCUMENTS

| | | | | |
|---|---|---|---|---|
| 2002/0089660 | A1* | 7/2002 | Weiss ..................... | G06V 40/18 340/576 |
| 2006/0153740 | A1* | 7/2006 | Sultan ................ | G01N 21/3504 422/88 |
| 2009/0249432 | A1* | 10/2009 | O'Sullivan ........... | H04L 51/043 726/1 |
| 2009/0293589 | A1* | 12/2009 | Freund ................. | G07C 5/0891 73/23.3 |
| 2010/0108425 | A1* | 5/2010 | Crespo ................. | B60K 28/063 180/272 |
| 2013/0138397 | A1* | 5/2013 | Kiet ....................... | G06Q 50/01 702/188 |
| 2015/0130611 | A1* | 5/2015 | Roth ........................ | G07C 9/28 340/539.11 |
| 2019/0145956 | A1* | 5/2019 | Lyon .................... | B60K 28/063 702/100 |

(Continued)

*Primary Examiner* — Anh V La

(57) ABSTRACT

Embodiments provide probation officers with a recidivism probability score that is to be considered in conjunction with, or as a component of, compliance-based removal decisions. The recidivism score is computed based on a weighted combination of evidence-based factors that have been shown, through machine learning and other statistical analytics, to have a strong correlation with long-term recidivism rates. Examples of such evidence-based factors include the offender's Projected Date of IID Removal, Date of IID Install, Date of last Calibration, Violation Hour, Low BAC Non-Violation, BAC Violations, IID Violations, IID Service Lockout, IID Early Morning Violations, Violation Lockouts, and Circumvention Attempts Skipped Tests.

19 Claims, 2 Drawing Sheets

(56) References Cited

U.S. PATENT DOCUMENTS

2019/0248237 A1* 8/2019 Albakri ................ B60W 50/14
2021/0064730 A1* 3/2021 Schrag .................... H04L 67/04

* cited by examiner

CALCULATING A RECIDIVISM PROBABILITY SCORE FOR COMPLIANCE-BASED IGNITION INTERLOCK DEVICE REMOVAL

This application is a continuation of U.S. patent application Ser. No. 17/180,426 filed on Feb. 19, 2021 entitled, "Calculating a Recidivism Probability Score for Compliance-Based Ignition Interlock Device Removal", which claims benefit to U.S. Provisional Application No. 62/979,946 filed on Feb. 21, 2020 and entitled, "Calculating a Recidivism Probability Score for Compliance-Based Ignition Interlock Device Removal", which application is hereby incorporated herein by reference.

TECHNICAL FIELD

Background

Ignition interlock systems are used to prevent, or otherwise inhibit, intoxicated persons from operating motor vehicles, and are generally installed as a sentencing condition for people convicted of Driving Under the Influence (DUI) or Driving While Intoxicated (DWI). In particular, an ignition interlock system evaluates a breath sample of a user to ensure that the user's Blood Alcohol Content (BAC) is below a certain threshold prior to permitting the user to start the vehicle's engine. Conventional ignition interlock systems are cumbersome to install in that they typically require an ignition controller to be hardwired between the vehicle's power-train control module (PCM) and starter. As a result, conventional ignition interlock systems must generally be installed by a certified technician, and can take as long as one hour to complete, which significantly increases the expense, and burden, borne by the user.

BRIEF DESCRIPTION OF THE DRAWINGS

For a more complete understanding of the present disclosure, and the advantages thereof, reference is now made to the following description taken in conjunction with the accompanying drawings, in which.

DETAILED DESCRIPTION OF ILLUSTRATIVE EMBODIMENTS

Figure 1:
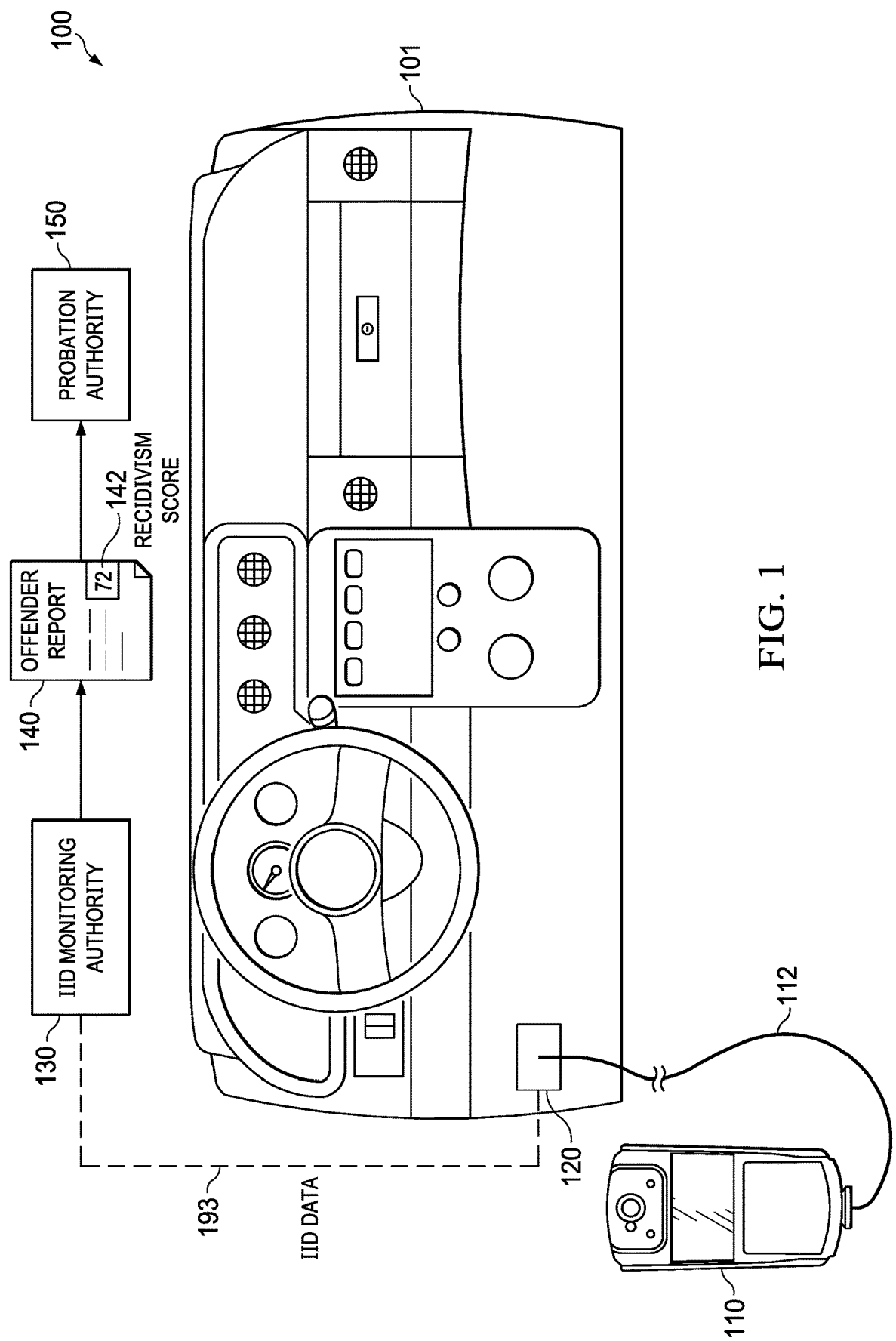
FIG. 1 is a diagram of an ignition interlock system.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. In practice, the Blood Alcohol Content (BAC) level of a user is generally estimated by measuring a Breath Alcohol Content (BrAC) level of a breath sample, and then converting the BrAC measurement into a BAC level. However, in this disclosure, the terms "Blood Alcohol Content (BAC)" and "Breath Alcohol Content (BrAC)" are used interchangeably and refer to any estimated or measured alcohol content derived from evaluating a breath sample. As used herein, the term "offender" refers to an individual who has been required to, or has otherwise agreed to, have an IID installed in their vehicle by a public authority, e.g., typically a court.

All fifty states have passed some form of ignition interlock device (IID) legislation, with more and more states moving towards mandatory IID installation for all offenders. These laws have come largely in response to research showing that IIDs significantly reduce short-term recidivism rates during the period in which the IID remains installed in the vehicle (hereinafter, the "IID installation period"). Even so, the research all show that offenders often experience similar rates of recidivism following removal of the IID. Indeed, after reviewing a number of different independent studies on the subject, the Task Force on Community Preventive Services (hereinafter "Elder") concluded that although "offenders who have ignition interlocks installed in their vehicles are at substantially lower risk for recidivism than those who . . . [do] not to have one installed, . . . the experience of being enrolled in an ignition interlock program by itself does not generally lead to long-term changes in the propensity to drink and drive that last beyond the period of interlock installation." American Journal of Preventive Medicine (March 2011), p. 368 "Effectiveness of Ignition Interlocks for Preventing Alcohol-Impaired Driving and Alcohol-Related Crashes" by Dr. Randy W. Elder, et al. The Elder publication is provided in Appendix 1. As referred to herein, the term "short-term recidivism rates" refers to recidivism rates of offenders during the IID installation period, the term "long-term recidivism rates" refers to recidivism rates of offenders after the IID has been removed from the offender's vehicle.

To better address long-term recidivism rates, Elder recommends "increasing the time period during which the interlock is installed[,] . . . making the removal contingent on appropriate behaviors[, and] . . . using the interlock in conjunction with alcohol rehabilitation programs." Id. at p. 370.

In response to Elder and similar recommendations by other industry experts, states have begun implementing compliance-based removal policies that condition removal of the IID on the offender's compliance with operational requirements of the IID during a period leading up to the IID removal (hereafter, the "reference period"). For example, Massachusetts's compliance-based removal policy states that an IID will not be removed until an offender has gone six consecutive months without an interlock infraction. The current compliance-based removal policies for all fifty states are outlined in Appendix 2.

Compliance-based removal policies are predicated on the theory that offenders who comply with the operational requirements of the IID will be less likely to recidivate following IID removal. However, it has been found that offenders with moderate alcohol use disorders are often able to adjust how and when they consume alcohol to avoid interlock infractions while still continuing to abuse alcohol during the IID installation period. For example, offenders with alcohol use disorders tend to drink heavily in the evening, and as a result will often register non-zero BAC levels when taking early morning IID tests. While this initially leads to a few failed BAC tests, most offenders soon learn that they can avoid early morning interlock violations by shifting their alcohol consumption to earlier in the evening. In these cases, offenders will often register a non-zero BAC level that is just below the failed BAC test threshold when taking the early morning IID test. For instance, an offender may blow a 0.035 when the failed BAC test threshold is set at 0.04. These and other similar workarounds significantly reduce the efficacy of compliance-based removal in reducing long term recidivism rates.

Aspects of this disclosure provide probation officers with a recidivism probability score (referred to as a "recidivism score" for short) that is to be considered in conjunction with, or as a component of, compliance-based removal decisions. The recidivism score is computed based on a weighted combination of evidence-based factors that have been shown, through machine learning and other statistical analytics, to have a strong correlation with long-term recidivism rates. Examples of evidence-based factors are provided in table 1 below. The recidivism score is far more difficult for offenders to manipulate than conventional compliance-based removal policies for several reasons. One reason is that the recidivism score is typically based on a higher number of factors than conventional compliance-based removal policies, which will typically focus only on whether the offender committed an interlock infraction during the reference period. It is generally more difficult for offenders to adjust their behavior to control for multiple factors, particularly in cases where the algorithm for computing the score is not disclosed to the offender, e.g., the offender may not know exactly which factors are being used to compute the recidivism score or the weights applied to those factors. Moreover, recidivism scores are often computed using at least one masked factor, which may typically be considered in combination with one or more unmasked factors. As used herein, a "masked factor" is any factor that is determined using at least some IID data that is not apparent based on feedback the offender receives from the IID or IID monitoring authority, while an "unmasked factor" is any factor that is determined entirely based on IID data that is apparent based on feedback the offender receives from the IID or IID monitoring authority.

The reliance on masked factors makes it even more difficult for offenders to manipulate the recidivism score. In particular, most offenders adjust their behavior based on feedback they receive from the IID or IID monitoring authority. For example, most states set the failed BAC test threshold at approximately 0.04, and IIDs are generally configured to notify the offender whether they passed or failed the BAC test without notifying the offender of their actual measured BAC level in the event of a failed BAC test. Thus, an offender who passes a BAC test (e.g., an early morning BAC test) would not be able to determine his actual BAC level based on feedback from the IID. In this context, the risk factor "BRAC violations," which tracks the number of failed BAC tests, would be considered an unmasked factor because the IID notifies the offender each time he registers a failed BAC test. Conversely, the risk factor "low BAC non-violations," which tracks the number of passed BAC tests in which the offender registered a non-zero BAC level, would be considered a masked risk factor because the offender cannot distinguish zero-BAC passed tests from low-BRAC passed tests based on feedback provided by the IID. The inclusion of masked factors therefore tends to make it even more difficult for offenders to achieve a favorable recidivism score while continuing to abuse alcohol during the IID installation period because there is no feedback mechanism that tells them how and when to adjust their behavior. These and other details are explained in greater detail below.

FIG. 1 is a diagram of an IID 100 installed in a vehicle 101. The IID 100 includes a handheld 110 and an IID controller 120. The handheld 110 may include any component or collection of components that are configured to perform a BAC test and report IID data related to the BAC test to the IID controller 120. The IID controller 120 may include any component or collection of components that are configured to log and report IID data to the IID monitoring authority 130, as well as control (e.g., actuate or de-actuate) a starting mechanism of the vehicle. In some embodiments, the IID 100 includes other components in addition to the IID controller 120 and the handheld 110, e.g., a camera for facial recognition and/or offender monitoring, a wireless starter relay that replaces an OEM starter relay in the vehicle's relay box, etc.

The handheld 110 perform a BAC test by measuring a BAC level of a breath sample provided by an offender, and comparing the measured BAC level with a failed BAC test threshold typically ranging from 0.03 to 0.05 depending on which state the offender resides. The handheld 110 may also take breath pressure, temperature, humidity, directional flow (e.g., positive or negative pressure sensor) measurements for anti-circumvention purposes in addition to detecting the presence of a human hum-tone and the proximity of a human to the handheld 110. Once the BAC test has been performed, the handheld 110 sends IID data 112 to the IID controller 120 and provides feedback that notifies the offender whether the BAC test was passed or failed. The feedback provided by the IID varies from manufacturer to manufacturer, but typically includes displaying an indication on a screen of the handheld and/or emitting different sounds for passed tests and failed tests. In some cases, the handheld 110 may abort an initial BAC test (e.g., when a pressure or temperature reading is outside an acceptable range), and prompt the offender to re-take the BAC test. Other data that may be communicated to the handheld includes measurement data related to pressure, temperature, humidity, and directional flow (e.g., positive or negative pressure sensor), as well as data related to detection of the presence of a human hum-tone and/or proximity detection. The IID data 112 that is sent from the handheld 110 to the controller typically includes the measured BAC level as well as other information/measurements obtained while performing the BAC test. For example, the IID data 112 may include a pressure reading associated with the breath sample, a temperature reading associated with the breath sample, and an indication as to whether a given BAC test complete or aborted.

The IID data 112 is typically logged by the IID controller 120 along with other data collected by the IID controller 120, and communicated as IID data 193 to the IID monitoring authority. The IID data 193 may include IID data 112 received from the handheld as well as other data collected or generated by the IID controller 120, including data received from other distributed components of the IID 100 (e.g., pictures/video received from an IID camera, etc.), data received from the offender's cell phone, and/or data received from the vehicle 101 itself via a diagnostic or wireless connection between the vehicle 101 and the IID 100.

In some examples, the IID controller 120 wirelessly reports the IID data 193 to the IID monitoring authority 130 via a cellular network. This reporting may be done in real-time or on a periodic, semi-periodic, or aperiodic basis. In other examples, the IID controller 120 reports the logged IID data 193 during a regularly scheduled calibration appointment. This reporting may be sent over a wireless or wireline connection between the IID 100 and a calibration station. The IID data 193 may be encrypted to provide additional security in terms of keeping the offender's personal information secure, and preventing service technicians from accessing offender's private data. Although the IID data 193 is described as being logged and reported by the IID controller 120, it should be appreciated that this is only one example of how the IID 100 may be configured, and that in other configurations the IID data 193 may be logged and/or reporting using a different component of the IID 100, such as the handheld 110. Upon receiving the IID data 193, the IID monitoring authority 130 may calculate a recidivism score, which is included in an offender report 140 that is sent from the IID monitoring authority 130 to the monitoring authority 150. The offender report 140 may include various information, including a list of interlock infractions In some embodiments, the IID controller 120 is also responsible for enabling or disabling operation of the vehicle. For example, the IID controller 120 may be hardwired into the vehicle's ignition system or otherwise wireless communicate with a wireless relay that is plugged into an OEM port in the vehicle's relay box. In other embodiments, another component of the IID 100 is responsible for enabling or disabling operation of the vehicle 101. For example, the IID 100 may include a wireless relay plugged into an OEM port in the vehicle's relay box, which enables or disables operation of the vehicle based on a signal received from the IID controller 120, the handheld 110, or some other component in the IID 100. Other examples are also possible. For instance, the IID controller 120 and/or the handheld 110 may enable/disable operation of the vehicle 101 by sending a signal (wireless or wireline) to the vehicle's 101 electronic control unit (ECU).

Figure 2:
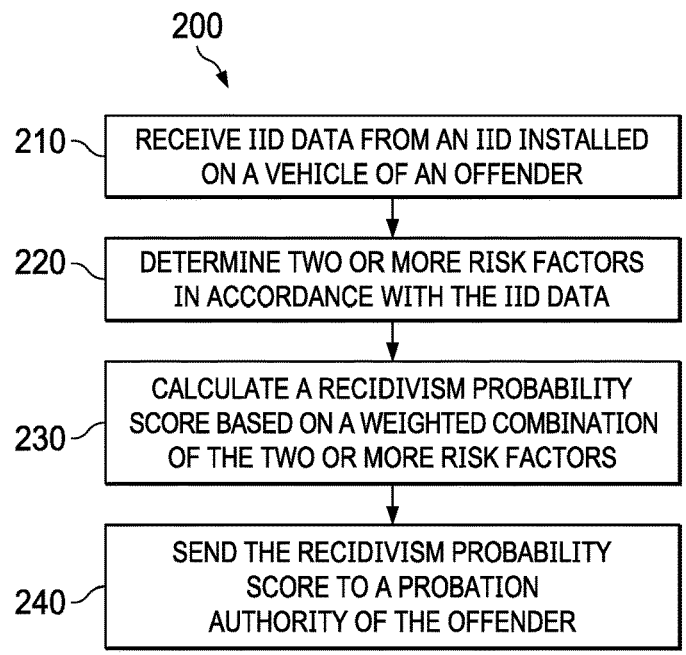
FIG. 2 is a flowchart of an embodiment method for calculating a recidivism probability score for compliance-based ignition interlock device removal.

Aspects of this disclosure provide embodiment techniques for calculating a recidivism score based on a weighted combination of two or more risk factors. FIG. 2 illustrates an embodiment method for calculating a recidivism probability score, as may be performed by an IID monitoring authority. At step 210, the IID monitoring authority receives IID data from an IID installed on a vehicle of an offender. The IID data may include measurements and/or outputs of the IID device, such as a log of IID tests performed, image data, vehicle data, and any other data or measurement generated by the IID. The log of IID tests may include a time stamp associated with each IID test, a result of the test (e.g., passed test, failed test, test aborted because of failed pressure or temperature reading, test aborted because user failed to satisfy human hum-tone and/or proximity anti-circumvention criteria, etc.). The log of IID tests may further include measurement levels associated with the tests (e.g., pressure or temperature readings, BAG levels, etc. At step 220, the IID monitoring authority determines two or more risk factors in accordance with the IID data. The risk factors may include one or more risk factors from table 1. However, it should be appreciated that the list of risk factors in table 1 is by no means exhaustive, and that other risk factors may be used to compute recidivism scores. At step 230, the IID monitoring authority calculates a recidivism score based on a weighted combination of the two or more risk factors identified in step 220. At step 240, the IID monitoring authority sends the recidivism score to a monitoring authority of the offender, which may use the recidivism score as a component in the compliance-based removal decision.

TABLE 1

| Factor | Description |
| --- | --- |
| Projected Date of IID Removal | A calculated date of IID removal based on a fixed formula (e.g., offender's prior convictions, etc.) |
| Date of IID Install | Length of time the IID has been installed in offender's vehicle |
| Date of last Calibration | Length of time since most recent IID calibration |
| Violation Hour | An average time a violation was logged. |
| Low BAC Non-Violation | Number of passed BAC tests registering non-zero BAC level during reference period |
| BAC Violations | Number of interlock violations due to high BAC during reference period |
| IID Violations | Number of interlock violations during reference period |
| IID Service Lockout | Number of service lockouts during reference period |
| IID Early Morning Violations | Number of detected interlock violations before defined time (e.g., between 5AM and 9AM) during reference period |
| Violation Lockouts | Number of service lockouts due to an interlock violation during reference period |
| Circumvention Attempts | Number of detected circumvention attempts during reference period |
| Skipped Tests | Number of skipped BAC tests during reference period |

In an embodiment, the violationhour parameter corresponds to a clock (e.g., a 24 hour clock, a 12 clock, etc.), and indicates a time (e.g., hour 14, 2:15 pm, etc.) in which a logged event occurred. In one embodiment, the violationhour parameter is derived from a variable (e.g., an "eventdate" variable) that contains a complete date and time stamp of the event that was logged. As an example, the violationhour parameter may indicate "hour 14" for an event that was logged at 2:14 pm.

Different equations may be used to calculate the recidivism score. For example, the following equation may be used to calculate recidivism score based on N risk factors: $rps = w1*f1 + w2*f2 + \ldots wn*fn$, where rps is the recidivism probability score, f1 is a value for a first risk factor, w1 is a weight associated with the first risk factor, f2 is a value for a second risk factor, w2 is a weight associated with the second risk factor, fn is a value for an Nth risk factor, and wn is a weight associated with the Nth risk factor. It should be appreciated that the number of risk factors may vary, and that the specific risk factors as well as the weights applied to those risk factors may vary across different implementations.

Figure 3:
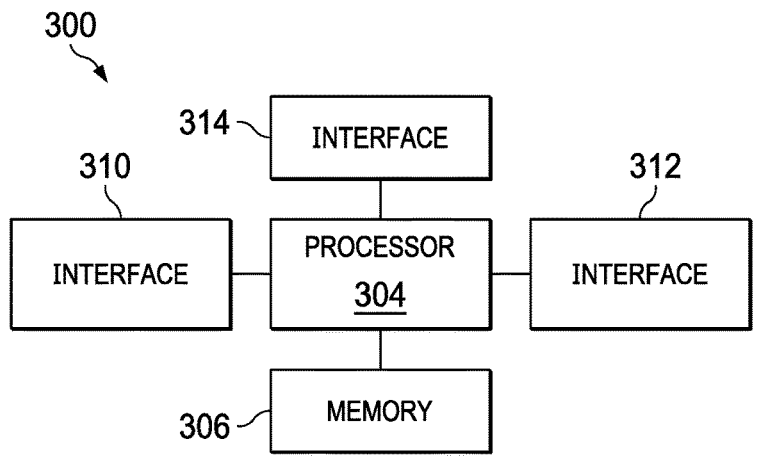
FIG. 3 is a diagram of an embodiment processing system.

FIG. 3 illustrates a block diagram of an embodiment processing system 300 for performing methods described herein, which may be installed in a host device. As shown, the processing system 300 includes a processor 304, a memory 306, and interfaces 310-314, which may (or may not) be arranged as shown in FIG. 3. The processor 304 may be any component or collection of components adapted to perform computations and/or other processing related tasks, and the memory 306 may be any component or collection of components adapted to store programming and/or instructions for execution by the processor 304. In an embodiment, the memory 306 includes a non-transitory computer readable medium. The interfaces 310, 312, 314 may be any component or collection of components that allow the processing system 300 to communicate with other devices/components and/or a user. For example, one or more of the interfaces 310, 312, 314 may be adapted to communicate data, control, or management messages from the processor 304 to applications installed on the host device and/or a remote device.

Figure 4:
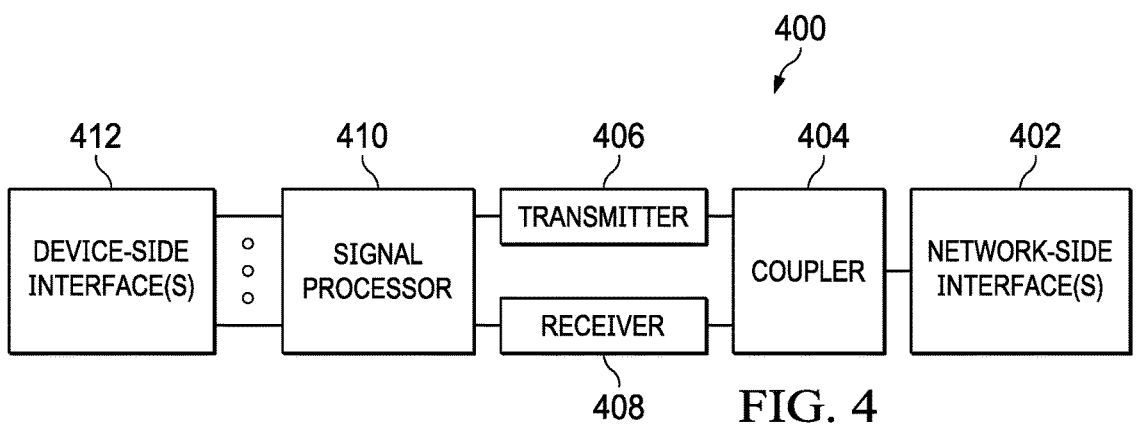
FIG. 4 is a diagram of an embodiment transceiver.

In some embodiments, one or more of the interfaces 310, 312, 314 connects the processing system 300 to a transceiver adapted to transmit and receive signaling over a telecommunications network. FIG. 4 illustrates a block diagram of a transceiver 400 adapted to transmit and receive signaling over a telecommunications network. The transceiver 400 may be installed in a host device. As shown, the transceiver 400 comprises a network-side interface 402, a coupler 404, a transmitter 406, a receiver 408, a signal processor 410, and a device-side interface 412. The network-side interface 402 may include any component or collection of components adapted to transmit or receive signaling over a wireless or wireline telecommunications network. The coupler 404 may include any component or collection of components adapted to facilitate bi-directional communication over the network-side interface 402. The transmitter 406 may include any component or collection of components (e.g., up-converter, power amplifier, etc.) adapted to convert a baseband signal into a modulated carrier signal suitable for transmission over the network-side interface 402. The receiver 408 may include any component or collection of components (e.g., down-converter, low noise amplifier, etc.) adapted to convert a carrier signal received over the network-side interface 402 into a baseband signal. The signal processor 410 may include any component or collection of components adapted to convert a baseband signal into a data signal suitable for communication over the device-side interface(s) 412, or vice-versa. The device-side interface(s) 412 may include any component or collection of components adapted to communicate data-signals between the signal processor 410 and components within the host device (e.g., the processing system 300, local area network (LAN) ports, etc.).

The transceiver 400 may transmit and receive signaling over any type of communications medium. In some embodiments, the transceiver 400 transmits and receives signaling over a wireless medium. For example, the transceiver 400 may be a wireless transceiver adapted to communicate in accordance with a wireless telecommunications protocol, such as a cellular protocol, a wireless local area network (WLAN) protocol (e.g., Wi-Fi, etc.), or any other type of wireless protocol (e.g., Bluetooth, near field communication (NFC), etc.). In such embodiments, the network-side interface 402 comprises one or more antenna/radiating elements. In other embodiments, the transceiver 400 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

What is claimed is:

1. A method for facilitating compliance-based ignition interlock device (IID) removal, the method comprising:
   receiving IID data from an IID installed in a vehicle of an offender;
   determining two or more risk factors in accordance with the IID data, including at least one factor of a low blood alcohol content (BAC) non-violations factor indicating a number of passed BAC tests in which the offender registered a non-zero BAC level that was below a threshold level;
   calculating a recidivism probability score based on a weighted combination of the two or more risk factors; and
   sending the recidivism probability score to a monitoring authority of the offender.

2. The method of claim 1, wherein the two or more risk factors include a date of IID installation factor that indicates how long the IID has been installed in the vehicle of the offender.

3. The method of claim 1, wherein the two or more risk factors include a date of last IID calibration factor that indicates when the IID was last calibrated.

4. The method of claim 1, wherein the two or more risk factors include a violation hour factor that indicates a time of day associated with one or more interlock violations registered by the IID.

5. The method of claim 1, wherein the two or more risk factors include an event values factor that indicates a factor description placeholder.

6. The method of claim 1, wherein the two or more risk factors include a blood alcohol content (BAC) violations factor that indicates a number of BAC violations during a reference period.

7. The method of claim 1, wherein the two or more risk factors include a service lockout factor that indicates a number of times the IID was locked during a reference period.

8. The method of claim 1, wherein the two or more risk factors include an early morning violation factor that indicates a number of failed blood alcohol content (BAC) tests occurring before a specific time of day.

9. The method of claim 1, wherein the two or more risk factors include a violation lockout factor that indicates a number of times the IID was locked due to an interlock violation during a reference period.

10. The method of claim 1, wherein the two or more risk factors include a circumvention factor that indicates a number of times the IID detected an attempted circumvention of the IID by the offender during a reference period.

11. The method of claim 1, wherein the two or more risk factors include a skipped test factor that indicates a number of times the offender skipped a blood alcohol content (BAC) test during a reference period.

12. A method for facilitating compliance-based ignition interlock device (IID) removal, the method comprising:
    receiving IID data from an IID installed in a vehicle of an offender;
    determining, from the IID data, at least one masked risk factor and at least one unmasked risk factor;
    calculating a recidivism probability score based on a combination of least one masked risk factor and at least one unmasked risk factor; and
    sending the recidivism probability score to a monitoring authority of the offender.

13. The method of claim 12, wherein the at least one masked risk factor includes a low blood alcohol content (BAC) non-violations factor indicating a number of passed BAC tests in which the offender registered a non-zero BAC level that was below a violation threshold level.

14. The method of claim 12, wherein the at least one unmasked risk factor includes a number of failed blood alcohol content (BAC) tests.

15. The method of claim 12, wherein the at least one masked risk factor is a factor that is determined using IID data that is not apparent based on feedback the offender receives from the IID.

16. The method of claim 12, wherein the at least one unmasked risk factor is a factor that is determined entirely based on IID data that is apparent based on feedback the offender receives from the IID.

17. A method for facilitating compliance-based ignition interlock device (IID) removal, the method comprising:
 receiving IID data from an IID installed in a vehicle of an offender;
 determining two or more risk factors in accordance with the IID data, the two or more risk factors including:
  a first factor of a low blood alcohol content (BAC) non-violations factor indicating a number of passed BAC tests in which the offender registered a non-zero BAC level that was below a violation threshold level;
  a second factor of an early morning violation factor that indicates at least one of a number of failed BAC tests or low BAC non-violations occurring before a specific time of day;
 calculating a recidivism probability score based on a combination of the two or more risk factors; and
 sending the recidivism probability score to a monitoring authority of the offender.

18. The method of claim 17, wherein the first factor is associated with a first weight and the second factor is associated with a second weight, and calculating the recidivism probability score is based on a weighted combinations of the first factor and the second factor.

19. The method of claim 17, wherein the two or more risk factors include a number of failed blood alcohol content (BAC) tests.

* * * * *